US011887024B2

(12) United States Patent
Takiguchi et al.

(10) Patent No.: US 11,887,024 B2
(45) Date of Patent: Jan. 30, 2024

(54) VEHICLE MANAGEMENT DEVICE, VEHICLE MANAGEMENT METHOD, VEHICLE MANAGEMENT SYSTEM, AND VEHICLE

(71) Applicant: TOYOTA JIDOSHA KABUSHIKI KAISHA, Toyota (JP)

(72) Inventors: Yuka Takiguchi, Toyota (JP); Tetsushi Okamoto, Miyoshi (JP); Hirokazu Kobayashi, Toyota (JP); Minoru Nakadori, Toyota (JP); Daiki Kaneichi, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/592,836

(22) Filed: Feb. 4, 2022

(65) Prior Publication Data
US 2022/0261705 A1    Aug. 18, 2022

(30) Foreign Application Priority Data

Feb. 17, 2021    (JP) .................................. 2021-023739

(51) Int. Cl.
*G06Q 10/02*    (2012.01)
*G06Q 10/0631*    (2023.01)
*B60L 53/10*    (2019.01)
*G08G 1/00*    (2006.01)
*B60W 60/00*    (2020.01)

(52) U.S. Cl.
CPC .............. *G06Q 10/02* (2013.01); *B60L 53/10* (2019.02); *B60W 60/00253* (2020.02); *G06Q 10/06311* (2013.01); *G06Q 10/06315* (2013.01); *G08G 1/202* (2013.01)

(58) Field of Classification Search
CPC ............ G06Q 10/02; G06Q 10/06311; G06Q 10/06315; B60L 53/10; B60W 60/00253; G08G 1/202
USPC ............................................................ 705/5
See application file for complete search history.

(56) References Cited

U.S. PATENT DOCUMENTS

| | | | |
|---|---|---|---|
| 11,089,440 B1 * | 8/2021 | Sawahashi | H04L 67/52 |
| 2011/0225269 A1 * | 9/2011 | Yap | G06Q 10/06 709/219 |
| 2017/0351955 A1 * | 12/2017 | Fletcher | G06Q 50/30 |

(Continued)

FOREIGN PATENT DOCUMENTS

JP    2017-102553 A    6/2017

OTHER PUBLICATIONS

"Car sharing system: what transaction dataset reveal on users' behaviors" Published by IEEE (Year: 2007).*

*Primary Examiner* — Zeina Elchanti
(74) *Attorney, Agent, or Firm* — Oliff PLC

(57) ABSTRACT

A vehicle management device includes one or more processors configured to: manage a plurality of vehicles to be provided for users in a car sharing service; manage, as a plurality of first vehicles, a part of the vehicles to be allocated to an on-demand use in which the users use the car sharing service without reservation; manage, as a plurality of second vehicles, a part of the vehicles to be allocated to a reservation use in which the users use the car sharing service with the reservation; and change at least one of the second vehicles to the first vehicles when the number of the first vehicles is less than a first predetermined number.

13 Claims, 9 Drawing Sheets

(56) References Cited

U.S. PATENT DOCUMENTS

| | | | |
|---|---|---|---|
| 2019/0360833 A1* | 11/2019 | Liu | G01C 21/3415 |
| 2020/0134645 A1* | 4/2020 | Kaneichi | G08G 1/202 |
| 2020/0279195 A1* | 9/2020 | Kobori | G08G 1/00 |
| 2021/0042860 A1* | 2/2021 | Kawasaki | G01C 21/343 |
| 2021/0366287 A1* | 11/2021 | Lee | G06N 20/00 |
| 2022/0277652 A1* | 9/2022 | Li | G08G 1/207 |

* cited by examiner

VEHICLE MANAGEMENT DEVICE, VEHICLE MANAGEMENT METHOD, VEHICLE MANAGEMENT SYSTEM, AND VEHICLE

CROSS-REFERENCE TO RELATED APPLICATION

This application claims priority to Japanese Patent Application No. 2021-023739 filed on Feb. 17, 2021, incorporated herein by reference in its entirety.

BACKGROUND

1. Technical Field

The present disclosure relates to a vehicle management device, a vehicle management method, a vehicle management system, and a vehicle.

2. Description of Related Art

An example of related arts is vehicle management systems for car sharing and car rental. For example, Japanese Unexamined Patent Application Publication No. 2017-102553 (JP 2017-102553 A) discloses a vehicle management system in which vehicles can smoothly be interchanged by combining vehicle management of car sharing and vehicle management of car rental.

SUMMARY

Users use vehicles by reservation or on demand. Vehicle management is desirably adapted to both the reservation use and the on-demand use.

The present disclosure provides vehicles smoothly for both the reservation use and the on-demand use.

A vehicle management device according to a first aspect of the present disclosure includes one or more processors configured to: manage a plurality of vehicles to be provided for users in a car sharing service; manage, as a plurality of first vehicles, a part of the vehicles to be allocated to an on-demand use in which the users use the car sharing service without reservation; manage, as a plurality of second vehicles, a part of the vehicles to be allocated to a reservation use in which the users use the car sharing service with the reservation; and change at least one of the second vehicles to the first vehicles when the number of the first vehicles is less than a first predetermined number.

A vehicle management system according to a second aspect of the present disclosure includes: the vehicle management device according the first aspect; and the vehicles to be provided for the users in the car sharing service.

A vehicle management method according to a third aspect of the present disclosure is a method for managing a plurality of vehicles to be provided for users in a car sharing service. The vehicle management method includes: managing, as a plurality of first vehicles, a part of the vehicles to be allocated to an on-demand use in which the users use the car sharing service without reservation; managing, as a plurality of second vehicles, a part of the vehicles to be allocated to a reservation use in which the users use the car sharing service with the reservation; and changing at least one of the second vehicles to the first vehicles when the number of the first vehicles is less than a first predetermined number.

A vehicle according to a fourth aspect of the present disclosure includes one or more processors configured to: control traveling of the vehicle by autonomous driving based on management information output from a vehicle management device; move the vehicle to a first area when the vehicle is managed as a first vehicle to be allocated to an on-demand use; and move the vehicle to a second area when the vehicle is managed as a second vehicle to be allocated to a reservation use.

In the vehicle management device, the vehicle management method, the vehicle management system, and the vehicle according to the embodiments of the present disclosure, the vehicles can be provided smoothly for both the reservation use and the on-demand use.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Example of Configuration of Vehicle Management System 1

Figure 1:
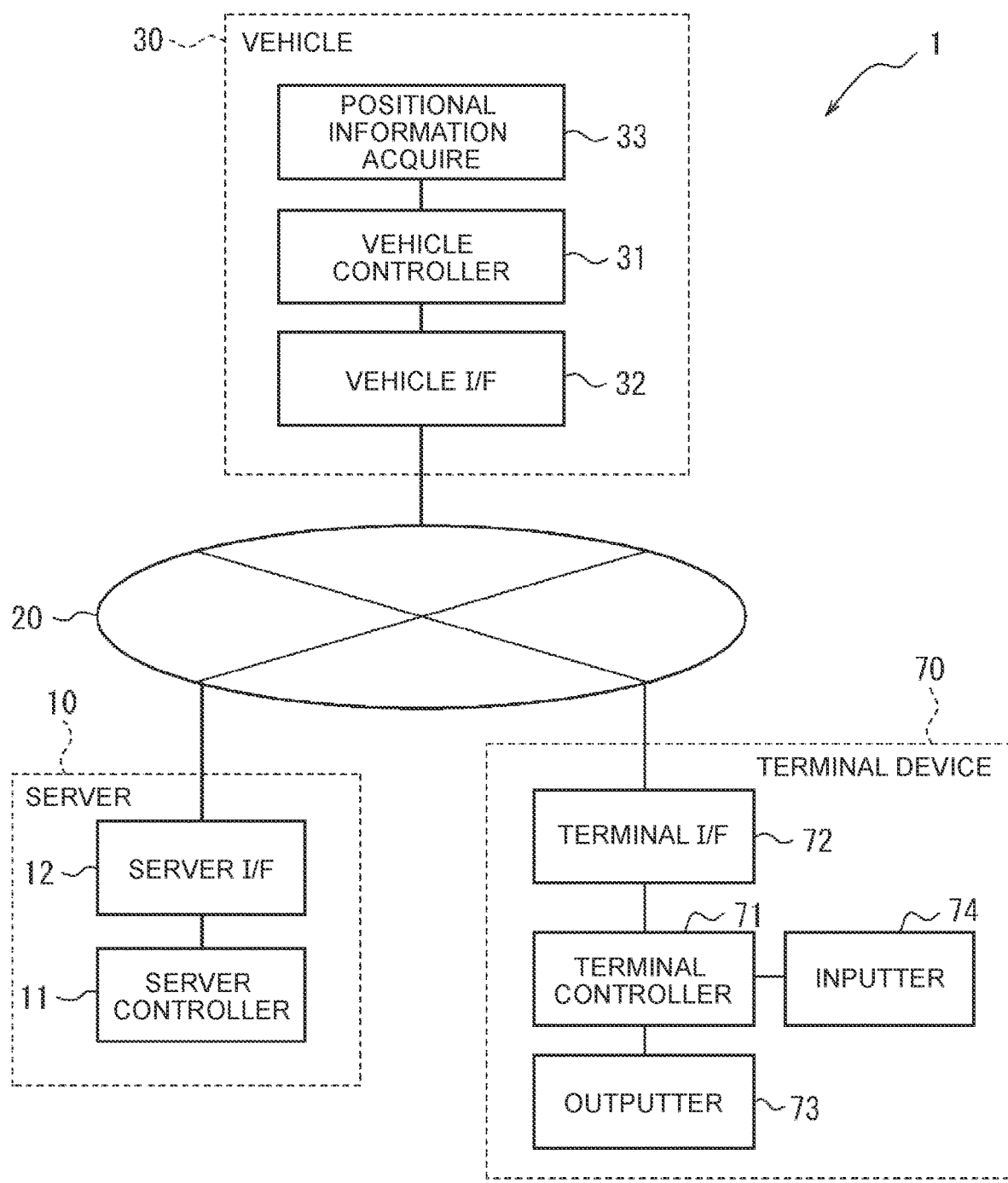
FIG. 1 is a block diagram illustrating an example of the configuration of a vehicle management system according to one embodiment.

As illustrated in FIG. 1, a vehicle management system 1 according to one embodiment includes a server 10 and a vehicle 30. The server 10 and the vehicle 30 are connected to a network 20 and communicable with each other. The number of servers 10 and the number of vehicles 30 are not limited to one, and may be two or more.

The vehicle management system 1 provides a car sharing service in which a user may use the vehicle 30. The vehicle management system 1 manages vehicles 30 to be provided for users in the car sharing service. The car sharing service includes a service that can be offered to users without reservation. The car sharing service includes a service that can be offered to users with reservation. The use of the car sharing service by users without reservation is referred to also as "on-demand use". The use of the car sharing service by users with reservation is referred to also as "reservation use". In the on-demand use, a user can use a vehicle 30 when the vehicle 30 is available at the time of request for the on-demand use. In the reservation use, a user can use a vehicle 30 by making a reservation in advance when the vehicle 30 is available in an expected use period.

The on-demand use and the reservation use may be distinguished by a period from a time to request the use of the service to a time to start the use. The on-demand use is associated with a use in a case where the period from the time to request the use to the time to start the use is shorter than a predetermined reservation limit period. The reservation use is associated with a use in a case where the period from the time to request the use to the time to start the use is equal to or longer than the reservation limit period. The user can make a reservation for the use of the vehicle 30 by requesting the use by a time earlier than the time to start the use by the reservation limit period or longer. In other words, the vehicle management system 1 accepts the request for the reservation use until the time earlier than the time to start the use by the reservation limit period. The reservation limit period may be set as a period necessary to reserve the vehicle 30 to be allocated to the reservation use. For example, the reservation limit period may be set as a period necessary to return the vehicle 30 by the time to start the reservation use when the vehicle 30 is allocated to another use before the reservation use. For example, the reservation limit period may be set by hours such as one hour or two hours or by minutes such as 30 minutes.

Description is given of an example of components of the vehicle management system 1 that manages the vehicles 30 to be provided for users in the car sharing service.

Server 10

The server 10 includes a server controller 11 and a server interface 12. The server interface 12 is referred to also as "server I/F 12".

The server controller 11 controls components of the server 10. The server controller 11 is also referred to simply as "controller". The server controller 11 may include one or more processors. In this embodiment, the "processor" is, but not limited to, a general-purpose processor or a processor dedicated to specific processes. The server controller 11 may include one or more dedicated circuits. Examples of the dedicated circuit include a field-programmable gate array (FPGA) and an application specific integrated circuit (ASIC). The server controller 11 may include the dedicated circuit in place of or together with the processor.

The server 10 may further include a storage. Examples of the storage include, but not limited to, a semiconductor memory, a magnetic memory, and an optical memory. For example, the storage may function as a main memory, an auxiliary memory, or a cache memory. The storage may include an electromagnetic storage medium such as a magnetic disk. The storage may be a non-transitory computer-readable medium. The storage stores any information to be used for operations of the server 10. For example, the storage may store system programs or application programs. The storage may be included in the server controller 11.

For example, the server I/F 12 outputs information or data from the server controller 11, or inputs information or data to the server controller 11. The server I/F 12 is also referred to simply as "interface" or "I/F".

The server I/F 12 may include a communication module communicable with the vehicles 30 via the network 20. Examples of the communication module include a communication module conforming to a mobile communication standard such as 4th Generation (4G) or 5th Generation (5G), and a communication module conforming to a communication standard such as a wired or wireless local area network (LAN). The communication module is not limited to those communication modules, and may include communication modules conforming to various communication standards. The server I/F 12 may be connectable to the communication module.

The server 10 may include one server device or a plurality of server devices communicable with each other. The server 10 is referred to also as "vehicle management device".

Vehicle 30

Each vehicle 30 includes a vehicle controller 31 and a vehicle I/F 32. The vehicle controller 31 and the vehicle I/F 32 are communicably connected via a dedicated line or an on-board network such as a controller area network (CAN).

The vehicle controller 31 controls components of the vehicle 30. The vehicle controller 31 may include one or more processors. The vehicle controller 31 may include one or more dedicated circuits in place of or together with the processor.

The vehicle controller 31 may further include a storage. Examples of the storage include, but not limited to, a semiconductor memory, a magnetic memory, and an optical memory. For example, the storage may function as a main memory, an auxiliary memory, or a cache memory. The storage may include an electromagnetic storage medium such as a magnetic disk. The storage may be a non-transitory computer-readable medium. The storage stores any information to be used for operations of the vehicle controller 31. For example, the storage may store system programs or application programs. The storage may be provided separately from the vehicle controller 31.

For example, the vehicle I/F 32 outputs information or data from the vehicle controller 31, or inputs information or data to the vehicle controller 31. The vehicle I/F 32 is also referred to simply as "interface" or "I/F".

The vehicle I/F 32 communicates with the server 10 via the network 20. For example, the vehicle I/F 32 may be at least a part of an on-board communication device. The vehicle I/F 32 may include a communication module connected to the network 20. Examples of the communication module include a communication module conforming to a mobile communication standard such as 4G or 5G, and a communication module conforming to a communication standard such as a wired or wireless LAN. The communication module is not limited to those communication modules, and may include communication modules conforming to various communication standards. The vehicle I/F 32 may be connectable to the communication module.

The vehicle 30 further includes a positional information acquirer 33 though the positional information acquirer 33 is not essential. The positional information acquirer 33 is communicably connected to the vehicle controller 31 or the vehicle I/F 32 via a dedicated line or the on-board network such as the CAN. The positional information acquirer 33 acquires positional information of the vehicle 30. The positional information acquirer 33 may include a receiver adapted to a satellite positioning system. Examples of the receiver adapted to the satellite positioning system include a Global Positioning System (GPS) receiver. In this embodiment, the vehicle controller 31 can acquire the positional information of the vehicle 30 by using the positional information acquirer 33.

The vehicle 30 may be a motor vehicle including a motor to be driven by electric power and a battery configured to supply electric power for driving the motor.

The vehicle 30 may be driven by a driver. The vehicle 30 may travel by autonomous driving. For example, the autonomous driving may be executed at any one of Level 1 to Level 5 defined by the Society of Automotive Engineers (SAE). The autonomous driving is not limited to that in the exemplified definition, and may be executed based on other definitions.

Terminal Device 70

As illustrated in FIG. 1, the vehicle management system 1 further includes a terminal device 70 though the terminal device 70 is not essential. The number of terminal devices 70 in the vehicle management system 1 is not limited to one, and may be two or more. The terminal device 70 is carried by a user. The terminal device 70 receives an input of a user' request for use of a vehicle 30, and outputs information related to the request to the server 10.

The terminal device 70 may be a mobile terminal such as a smartphone or a tablet, or a personal computer (PC) such as a notebook PC or a tablet PC. The terminal device 70 is not limited to those examples, and may include various devices.

The terminal device 70 includes a terminal controller 71 and a terminal interface 72. The terminal interface 72 is referred to also as "terminal I/F 72".

The terminal controller 71 controls components of the terminal device 70. The terminal controller 71 is also referred to simply as "controller". The terminal controller 71 may be identical or similar to the server controller 11 of the server 10. The terminal controller 71 may include one or more processors. The terminal controller 71 may include one or more dedicated circuits. Examples of the dedicated circuit include an FPGA and an ASIC. The terminal controller 71 may include the dedicated circuit in place of or together with the processor.

The terminal device 70 may further include a storage. The storage of the terminal device 70 may be identical or similar to the storage of the server 10. Examples of the storage include, but not limited to, a semiconductor memory, a magnetic memory, and an optical memory. For example, the storage may function as a main memory, an auxiliary memory, or a cache memory. The storage may include an electromagnetic storage medium such as a magnetic disk. The storage stores any information to be used for operations of the terminal device 70. For example, the storage may store system programs or application programs. The storage may be included in the terminal controller 71.

For example, the terminal I/F 72 outputs information or data from the terminal controller 71, or inputs information or data to the terminal controller 71. The terminal I/F 72 is also referred to simply as "interface" or "I/F".

The terminal I/F 72 may be identical or similar to the server I/F 12. The terminal I/F 72 may include a communication module communicable with the server 10 or other devices via the network 20. Examples of the communication module include, but not limited to, a communication module conforming to a mobile communication standard such as 4G or 5G. The terminal I/F 72 may be connectable to the communication module.

The terminal device 70 further includes an inputter 74 though the inputter 74 is not essential. The inputter 74 may be an input device configured to receive an input of information or data from the user. For example, the input device may include a touch panel, a touch sensor, or a pointing device such as a mouse. The input device may include physical keys. The input device may include an audio input device such as a microphone.

The inputter 74 can acquire positional information of the terminal device 70 or the user. The inputter 74 may include a receiver adapted to a satellite positioning system. Examples of the receiver adapted to the satellite positioning system include a GPS receiver.

The inputter 74 may output the acquired information to the server 10 via the terminal I/F 72. The terminal controller 71 may cause the terminal I/F 72 to output the information acquired by the inputter 74.

The terminal device 70 further includes an outputter 73 though the outputter 73 is not essential. The outputter 73 is an output device configured to output information or data to the user. The output device may include a display device configured to output visual information such as images, texts, or graphical objects. Examples of the display device include a liquid crystal display (LCD), an organic electroluminescence (EL) display, an inorganic EL display, and a plasma display panel (PDP). The display device is not limited to those displays, and may include various other types of display. The display device may include a light emission device such as a light emission diode (LED) or a laser diode (LD). The display device may include various other devices. The output device may include an audio output device such as a loudspeaker configured to output audio information such as voice. The output device is not limited to those examples, and may include various other devices.

The outputter 73 may output information acquired from the server 10 via the terminal I/F 72. The terminal controller 71 may cause the outputter 73 to output the information acquired by the terminal I/F 72.

Example of Operations of Vehicle Management System 1

A specific example of operations of the vehicle management system 1 are described below.

When requesting use of a vehicle 30, a user may input the request to his/her terminal device 70. In other words, the terminal controller 71 of the terminal device 70 causes the inputter 74 to receive the input of the request from the user, generates information related to the request based on the received input, and outputs the generated information from the terminal I/F 72 to the server 10.

The server controller 11 of the server 10 allocates a vehicle 30 to be used by the user based on the information related to the user's request. Specifically, the server controller 11 selects a vehicle 30 to be used by the user from among vehicles 30 on standby for use by the user, and allocates the selected vehicle 30 to the user. The vehicle 30 on standby is referred to also as "standby vehicle". That is, the server controller 11 allocates a vehicle 30 selected from among the standby vehicles to the user.

The user requests the on-demand use or the reservation use. The server controller 11 selects the vehicle 30 to be allocated to the user based on the type of use requested by the user.

When the vehicle 30 is allocated to the user, the server controller 11 outputs, to the terminal device 70, information for notifying the user that the request is accepted. The server controller 11 outputs, to the terminal device 70, information for notifying the user about a time when and a location where the user starts to use the vehicle 30. The server controller 11 may output, to the terminal device 70, information related to the vehicle 30 allocated to the user. When no vehicle 30 can be allocated to the user, the server controller 11 may output, to the terminal device 70, information for notifying the user that the request is not accepted. The terminal controller 71 notifies the user about the information acquired from the server 10 by causing the outputter 73 to output the information. The user starts to use the vehicle 30 by moving to the use start location at the use start time based on the acquired information.

Distinctive Management of Standby Vehicles Based on Types of Use to Which Vehicles Are Allocated The server controller 11 distinctively manages standby vehicles to be allocated to users who use the vehicles 30 on demand, and standby vehicles to be allocated to users who use the vehicles 30 by reservation. The standby vehicles to be allocated to the users who use the vehicles 30 on demand are referred to also as "first vehicles 34". The standby vehicles to be allocated to the users who use the vehicles 30 by reservation are referred to also as "second vehicles 35". That is, the server controller 11 manages the standby vehicles to be allocated to the on-demand use as the first vehicles 34, and manages the standby vehicles to be allocated to the reservation use as the second vehicles 35. By distinctively managing the standby vehicles to be allocated based on the types of use, the efficiency of use of the vehicles 30 can be increased.

Figure 2:
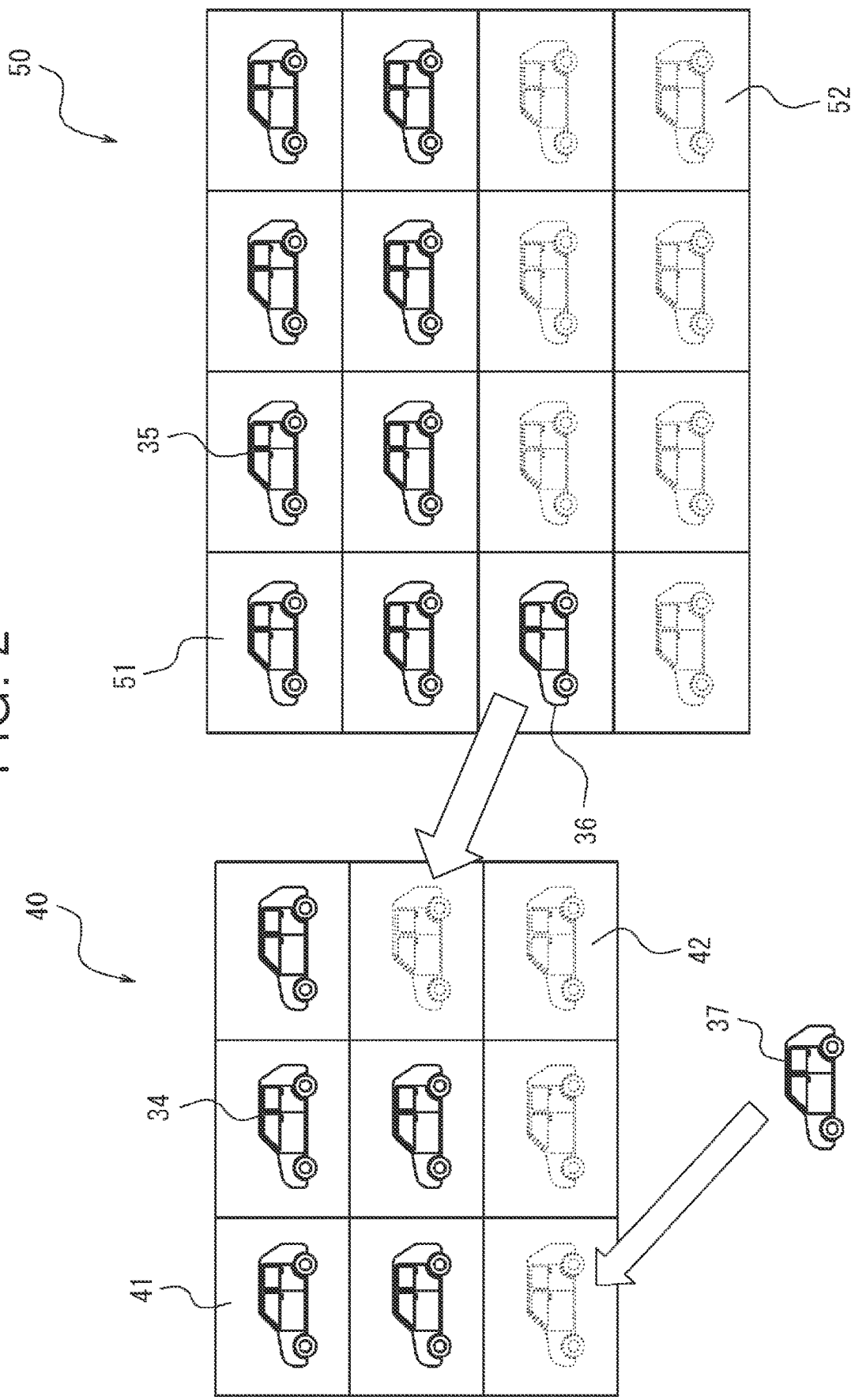
FIG. 2 is a diagram illustrating an example of how first vehicles to be allocated to on-demand use and second vehicles to be allocated to reservation use are managed distinctively.

As exemplified in FIG. 2, the server controller 11 may park the first vehicles 34 that are the standby vehicles in a first area 40, and park the second vehicles 35 that are the standby vehicles in a second area 50. In the example of FIG. 2, the first area 40 includes nine parking slots. The second area 50 includes 16 parking slots. Among the parking slots, a slot where the standby vehicle is parked is referred to also as "standby slot". A slot where the first vehicle 34 is parked in the first area 40 is referred to also as "standby slot 41". A slot where the second vehicle 35 is parked in the second area 50 is referred to also as "standby slot 51". Among the parking slots, a slot that is left empty without parking a vehicle 30 is referred to also as "empty slot". Empty slots in the first area 40 and the second area 50 are referred to also as "empty slot 42" and "empty slot 52", respectively. The nine parking slots in the first area 40 include five standby slots 41 and four empty slots 42. The 16 parking slots in the second area 50 include nine standby slots 51 and seven empty slots 52.

The server controller 11 controls the number of the first vehicles 34 to a first predetermined number or more. In this embodiment, the first predetermined number is set to six. The first predetermined number is not limited to six, and may be set to five or less or seven or more. In the example of FIG. 2, the number of the first vehicles 34 is five. The server controller 11 may keep the number of the first vehicles 34 to six or more by changing one second vehicle 35 out of the second vehicles 35 parked in the second area 50 to the first vehicle 34 as a changed vehicle 36. That is, when the number of the first vehicles 34 is less than the first predetermined number, the server controller 11 may change the second vehicle 35 to the first vehicle 34. The server controller 11 may keep the number of the first vehicles 34 to six or more by managing a return vehicle 37 returned from a user as the first vehicle 34. By controlling the number of the first vehicles 34 to the first predetermined number or more, a user's request for the on-demand use is accepted easily. As a result, user's convenience is improved.

The server controller 11 may control the number of the first vehicles 34 to a second predetermined number or less. In other words, the server controller 11 may control the number of the first vehicles 34 within a predetermined range that is the first predetermined number or more and the second predetermined number or less. In this embodiment, the second predetermined number is set to nine. For example, when the number of the first vehicles 34 is nine and a vehicle 30 allocated to a first user from among the first vehicles 34 is returned, the server controller 11 may manage the vehicle 30 as the second vehicle 35 without returning the vehicle 30 as the first vehicle 34 so that the number of the first vehicles 34 does not exceed the second predetermined number. The second predetermined number is not limited to nine as long as the second predetermined number is larger than the first predetermined number. The second predetermined number may be set to eight or less or ten or more.

The server controller 11 may control the number of the first vehicles 34 to the first predetermined number or more and the second predetermined number or less. That is, the server controller 11 may control the number of the first vehicles 34 within a wide predetermined range. By controlling the number of the first vehicles 34 within the wide predetermined range, the degree of freedom can be increased in terms of a timing to replenish the first vehicles 34.

For example, it is assumed that the server controller 11 promptly changes one second vehicle 35 to the first vehicle 34 when one first vehicle 34 is allocated to the on-demand use. In this case, the server controller 11 manages a vehicle 30 returned from the on-demand use after replenishment of the first vehicles 34 as the second vehicle 35 instead of the first vehicle 34 because of an upper limit of the number of the first vehicles 34. On the other hand, when the server controller 11 does not promptly replenish the first vehicles 34 but waits for return of the vehicle 30 from the on-demand use and manages the returned vehicle 30 as the first vehicle 34, the operation of changing the second vehicle 35 to the first vehicle 34 is omitted. In view of this, the operation of changing the second vehicle 35 to the first vehicle 34 is easily omitted when the degree of freedom is high in terms of the timing to replenish the first vehicles 34. That is, it is possible to reduce the frequency of changing the management method for the standby vehicles between the first vehicles 34 and the second vehicles 35. As a result, the efficiency of use of the vehicles 30 is improved. By controlling the number of the first vehicles 34 within the wide predetermined range as described above, the efficiency of use of the vehicles 30 is improved.

When the number of the first vehicles 34 is less than the first predetermined number because any first vehicle 34 is allocated to the on-demand use, the server controller 11 may select a second vehicle 35 to be changed to the first vehicle 34 based on schedules set for the second vehicles 35. For example, the server controller 11 may change, to the first vehicle 34, a second vehicle 35 for which a schedule for allocation to the reservation use is not set when the number of the first vehicles 34 is less than the first predetermined number. The server controller 11 may also change, to the first vehicle 34, a second vehicle 35 for which the schedule for allocation to the reservation use is not set when a request for the on-demand use is accepted while the number of the first vehicles 34 is the first predetermined number.

The server controller 11 may change the second vehicle 35 to the first vehicle 34 only during a period before a vehicle 30 allocated to the on-demand use is returned from the user and recovered as the first vehicle 34. In this case, the server controller 11 may select the second vehicle 35 to be changed to the first vehicle 34 based on schedules of the second vehicles 35 during the period before the recovery of the first vehicle 34. For example, the server controller 11 may change, to the first vehicle 34, a second vehicle 35 whose schedule is set after a scheduled time of the recovery of the first vehicle 34 but is not set during the period before the scheduled time of the recovery of the first vehicle 34.

The period before the recovery of the first vehicle 34 is determined based on a use period of the vehicle 30 allocated to the on-demand use. The use period of the vehicle 30 allocated to the on-demand use is rephrased as "on-demand use period". That is, the server controller 11 may change, to the first vehicle 34, a second vehicle 35 for which the schedule for allocation to the reservation use is not set during a period determined based on the on-demand use period.

The on-demand use period of the first vehicle 34 corresponds to a period in which a user uses the vehicle 30 on demand. The period in which the user can use the vehicle 30 on demand is limited by an upper limit of the on-demand use. To allocate a standby vehicle returned from the on-demand use to a subsequent use, a preparatory operation such as cleaning or battery charging is performed. Therefore, the server controller 11 can calculate the period before the recovery of the first vehicle 34 at most as a period obtained by adding a period required for the preparatory operation to the upper limit of the on-demand use. The period required for the preparatory operation is referred to also as "preparatory period". That is, the server controller 11 may calculate, as the period determined based on the on-demand use period, a period obtained by adding the preparatory period after the return of the vehicle 30 allocated to the on-demand use to the on-demand use period.

Example of Management of Schedules of Vehicles 30

When the vehicles 30 are managed as the first vehicles 34, the server controller 11 may set states or schedules of the first vehicles 34 as schedules of the first vehicles 34. Specifically, as the schedule of each first vehicle 34, the server controller 11 may set an available state indicating a schedule to keep the first vehicle 34 on standby for a request for the on-demand use. When the first vehicle 34 is actually allocated to the on-demand use, the server controller 11 may set, as the schedule of the first vehicle 34, a period obtained by adding the preparatory period after return from the on-demand use to a period of allocation to the on-demand use.

When the vehicles 30 are managed as the second vehicles 35, the server controller 11 may set states or schedules of the second vehicles 35 as schedules of the second vehicles 35. Specifically, the server controller 11 may set a schedule for allocation to the reservation use as the schedule of each second vehicle 35. As the schedule of the second vehicle 35, the server controller 11 may set an available state indicating a schedule to keep the second vehicle 35 on standby for a request for the reservation use. When the second vehicle 35 is actually allocated to the reservation use, the server controller 11 may set, as the schedule of the second vehicle 35, a period obtained by adding the preparatory period after return from the reservation use to a period of allocation to the reservation use.

The vehicles 30 may include a plurality of types of vehicle. The server controller 11 may vary operations between a case of managing schedules of one type of vehicles 30 and a case of managing schedules of a plurality of types of vehicles 30. Description is given of examples of management of the schedules in the respective cases.

Example of Management of Schedules of One Type

Figure 3:
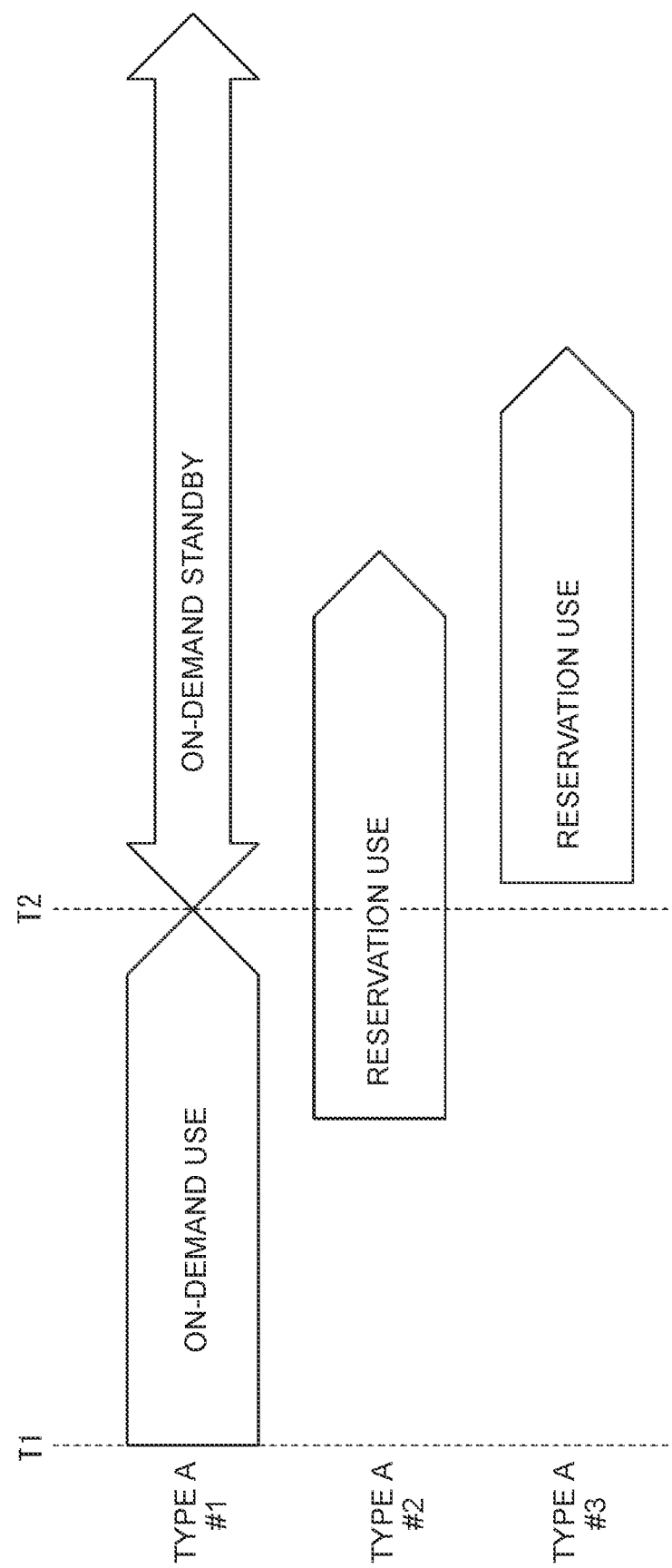
FIG. 3 is a diagram illustrating an example of management of schedules of one type of vehicles.

For example, the server controller 11 may manage standby vehicles of one type based on schedules illustrated in FIG. 3. In FIG. 3, the types of the standby vehicles are expressed as "Type A". The standby vehicles include three vehicles 30 represented by "#1", "#2", and "#3". At a time T1, the server controller 11 manages the #1 vehicle 30 as a first vehicle 34, and manages the #2 and #3 vehicles 30 as second vehicles 35.

The server controller 11 allocates the #1 vehicle 30 managed as the first vehicle 34 to the on-demand use from the time T1. The server controller 11 sets, as the schedule of the #1 vehicle 30, a period obtained by adding the preparatory period required after return from the on-demand use to a period of allocation of the #1 vehicle 30 to the on-demand use. The period set by allocating the #1 vehicle 30 to the on-demand use corresponds to a period expressed as "on-demand use" from the time T1 to a time T2 in FIG. 3.

The server controller 11 sets, as the schedule of the #1 vehicle 30, a period of standby for another request for the on-demand use after the on-demand use. The period of standby for a request for the on-demand use corresponds to a period expressed as "on-demand standby" after the time T2 in FIG. 3.

The server controller 11 sets, as the schedule of the #2 vehicle 30 managed as the second vehicle 35, a schedule for allocation to the reservation use during a period crossing the time T2. The server controller 11 sets, as the schedule of the #3 vehicle 30 managed as the second vehicle 35, a schedule for allocation to the reservation use with a use start time set after the time T2. The period of the schedule for allocation to the reservation use corresponds to a period expressed as "reservation use".

It is assumed that the number of the first vehicles 34 reaches a value less than the first predetermined number by allocating the #1 vehicle 30 managed as the first vehicle 34 to the on-demand use. To increase the number of the first vehicles 34, the server controller 11 selects a vehicle 30 to be changed to the first vehicle 34 from among the second vehicles 35. The #2 vehicle 30 out of the #2 and #3 vehicles 30 managed as the second vehicles 35 has its schedule set during the period from the time T1 to the time T2 when the #1 vehicle 30 has its schedule. The #3 vehicle 30 has no schedule set during the period from the time T1 to the time T2. Therefore, the server controller 11 selects the #3 vehicle 30 having no schedule set during the period of allocation of the #1 vehicle 30 to the on-demand use, thereby changing the #3 vehicle 30 to the first vehicle 34.

Figure 4:
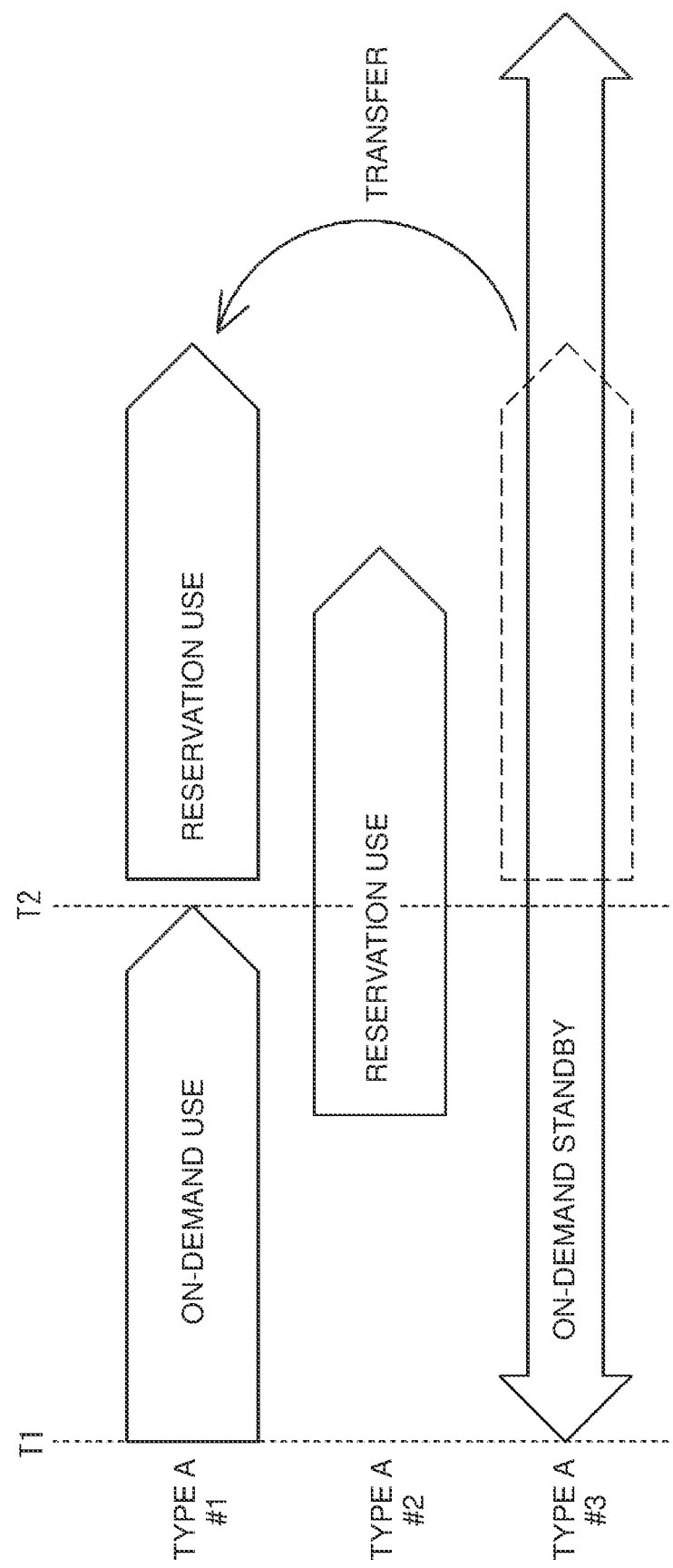
FIG. 4 is a diagram illustrating an example of a change of the schedules of the vehicles in FIG. 3.

When the #3 vehicle 30 is selected and changed to the first vehicle 34, the server controller 11 may cancel, as exemplified in FIG. 4, the schedule for allocation of the #3 vehicle 30 to the reservation use after the time T2, and set the schedule for the #1 vehicle 30. That is, the server controller 11 may transfer the schedule of the reservation use from the #3 vehicle 30 to the #1 vehicle 30. When the schedule after the time T2 is canceled, the server controller 11 changes the #3 vehicle 30 having no schedule after the time T1 to the first vehicle 34, and sets the #3 vehicle 30 on standby for a request for the on-demand use.

To rephrase the example of the management of the schedules of the same type described above, the server controller 11 may operate as follows to change, to the first vehicle 34, the second vehicle 35 of which the type is identical to the type of the vehicle 30 allocated to the on-demand use from among the first vehicles 34. First, as the schedule of the second vehicle 35 to be changed to the first vehicle 34, the schedule for allocation to the reservation use is not set during the period determined based on the on-demand use period, and is set after an elapse of the period determined based on the on-demand use period. In this case, the server controller 11 changes the second vehicle 35 to the first vehicle 34, and transfers the schedule for allocation of the second vehicle 35 to the reservation use to the vehicle 30 to be returned from the on-demand use. After the return of the vehicle 30 allocated to the on-demand use, the server controller 11 allocates the vehicle 30 to the reservation use without returning the vehicle 30 as the first vehicle 34.

The management operations described above may be rephrased as follows. The second vehicle 35 may be changed to the first vehicle 34 as a substitute for the first vehicle 34 allocated to the on-demand use. In this case, the change from the second vehicle 35 to the first vehicle 34 may be kept even after the return of the vehicle 30 allocated to the on-demand use. After the return of the vehicle 30 allocated to the on-demand use, the vehicle 30 need not be returned as the first vehicle 34. Thus, the frequency of movement of the vehicles 30 can be reduced. As a result, the efficiency of use of the vehicles 30 is improved.

Example of Management of Schedules of Plurality of Types

Figure 5:
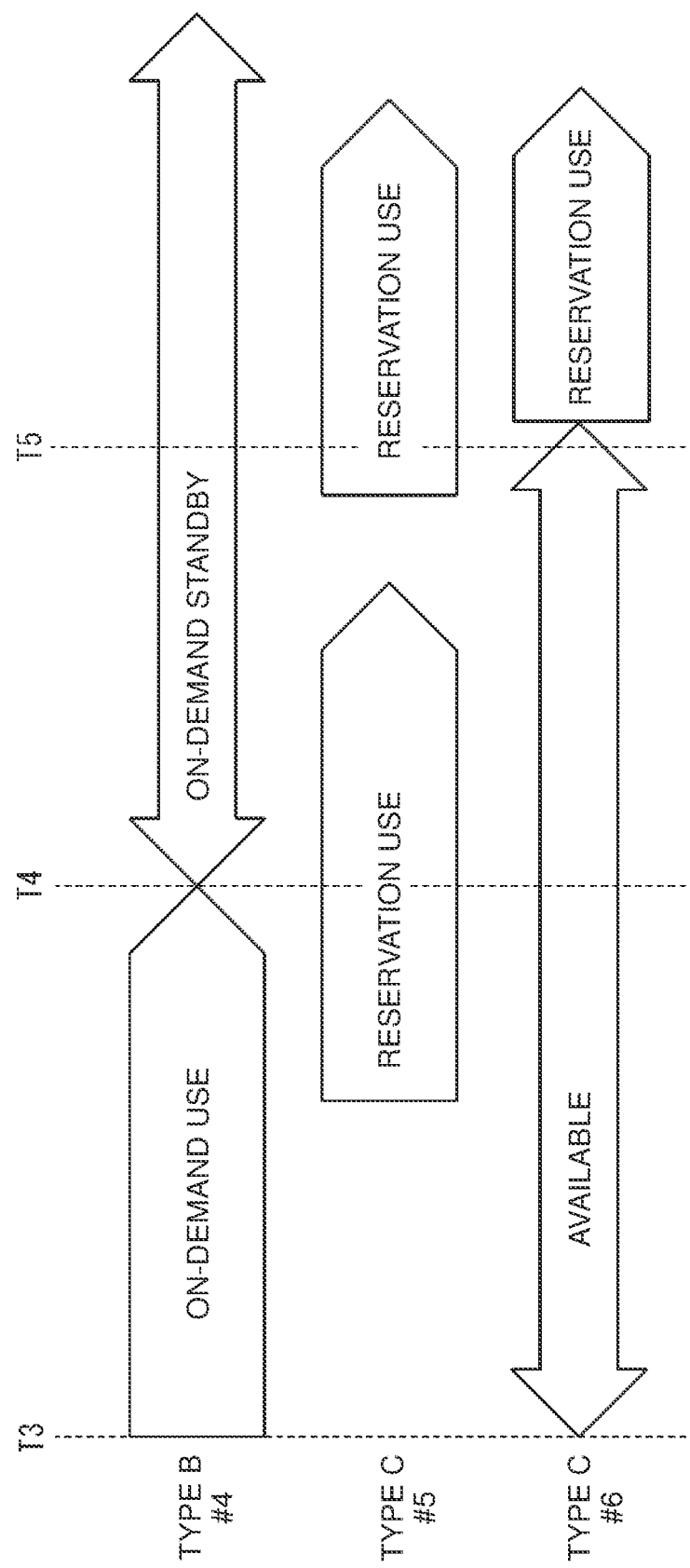
FIG. 5 is a diagram illustrating an example of management of schedules of two types of vehicles.

For example, the server controller 11 may manage standby vehicles of a plurality of types based on schedules illustrated in FIG. 5. In FIG. 5, the types of the standby vehicles are expressed as two types that are "Type B" and "Type C". The standby vehicles include three vehicles 30 represented by "#4" as Type B and "#5" and "#6" as Type C. At a time T3, the server controller 11 manages the #4 vehicle 30 of Type B as a first vehicle 34, and manages the #5 and #6 vehicles 30 of Type C as second vehicles 35.

The server controller 11 allocates the #4 vehicle 30 managed as the first vehicle 34 to the on-demand use from the time T3. The server controller 11 sets, as the schedule of the #4 vehicle 30, a period obtained by adding the preparatory period required after return from the on-demand use to a period of allocation of the #4 vehicle 30 to the on-demand use. The period set by allocating the #4 vehicle 30 to the on-demand use corresponds to a period expressed as "on-demand use" from the time T3 to a time T4 in FIG. 5.

The server controller 11 sets, as the schedule of the #4 vehicle 30, a period of standby for another request for the on-demand use after the on-demand use. The period of standby for a request for the on-demand use corresponds to a period expressed as "on-demand standby" after the time T4 in FIG. 5.

The server controller 11 sets, as the schedule of the #5 vehicle 30 managed as the second vehicle 35, a schedule for allocation to the reservation use during a period crossing the time T4. The server controller 11 sets, as the schedule of the #6 vehicle 30 managed as the second vehicle 35, a schedule for allocation to the reservation use with a use start time set after a time T5. The period of the schedule for allocation to the reservation use corresponds to a period expressed as "reservation use".

It is assumed that the number of the first vehicles 34 reaches a value less than the first predetermined number by allocating the #4 vehicle 30 managed as the first vehicle 34 to the on-demand use. To increase the number of the first vehicles 34, the server controller 11 selects a vehicle 30 to be changed to the first vehicle 34 from among the second vehicles 35. The #5 vehicle 30 out of the #5 and #6 vehicles 30 managed as the second vehicles 35 has its schedule set during the period from the time T3 to the time T4 when the #4 vehicle 30 has its schedule. The #6 vehicle 30 has no schedule set during the period from the time T3 to the time T4. Therefore, the server controller 11 selects the #6 vehicle 30 having no schedule set during the period of allocation of the #4 vehicle 30 to the on-demand use, thereby changing the #6 vehicle 30 to the first vehicle 34.

In the example of FIG. 5, the type of the #4 vehicle 30 (B) allocated to the on-demand use as the first vehicle 34 differs from the types of the #5 and #6 vehicles 30 (C) serving as candidates for the change to the first vehicle 34 unlike the example of FIG. 3. In this case, even if the #6 vehicle 30 is changed to the first vehicle 34, the schedule for allocation of the #6 vehicle 30 of Type C to the reservation use cannot be transferred to the #4 vehicle 30 of Type B after the time T4.

Figure 6:
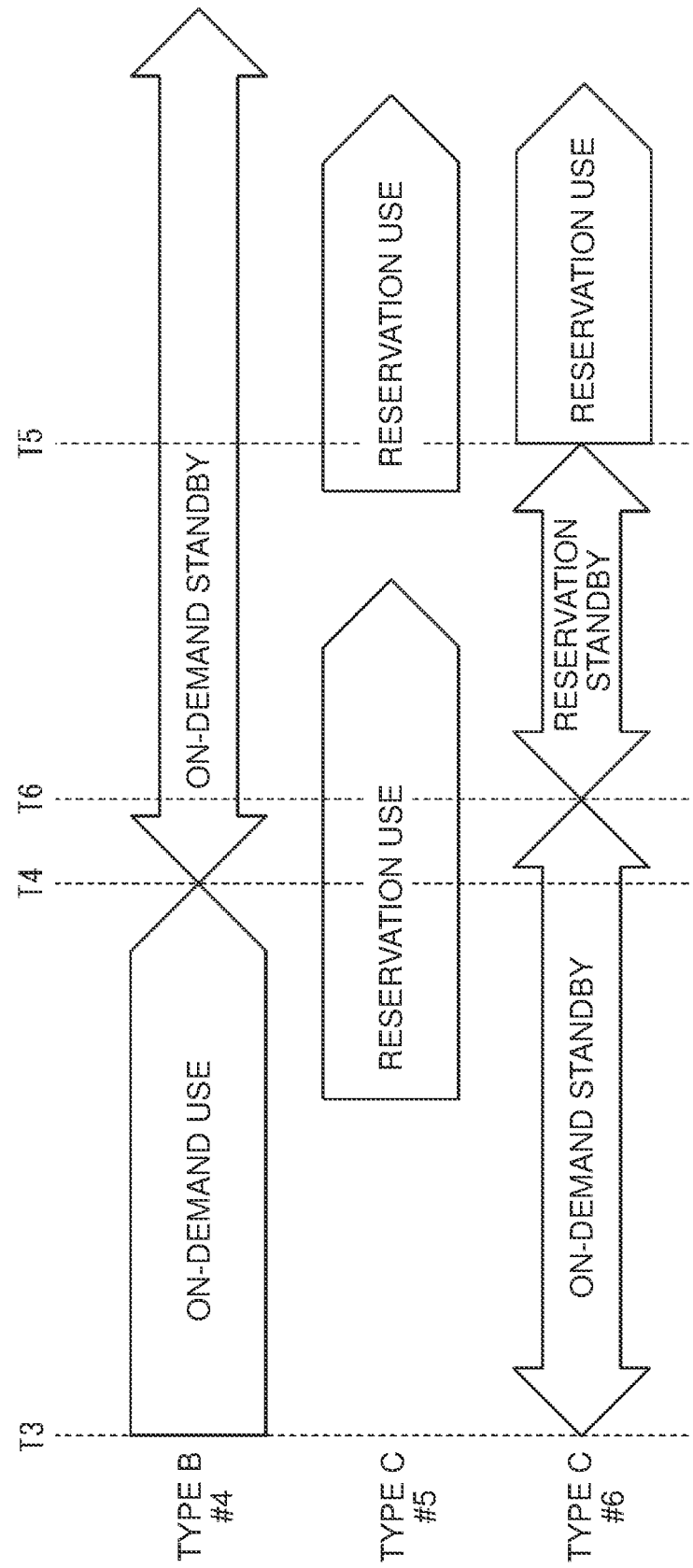
FIG. 6 is a diagram illustrating an example of a change of the schedules of the vehicles in FIG. 5.

As illustrated in FIG. 6, the server controller 11 sets, as the schedule of the #6 vehicle 30 of Type C, an on-demand standby state until a time T6 so as not to affect the schedule for allocation to the subsequent reservation use with the use start time set to the time T5. During a period from the time T6 to the time T5, the server controller 11 sets no other schedule to avoid a situation in which preparation of the vehicle 30 to be allocated at the time to start the subsequent reservation use cannot be completed in time because the #6 vehicle 30 is allocated to another on-demand use or another reservation use. The period from the time T6 to the time T5 when no other schedule is set for the allocation to the subsequent reservation use is expressed as "reservation standby". The server controller 11 sets the on-demand standby state after the time T4 as the schedule of the #4 vehicle 30 that is returned from the on-demand use and completes preparation for a subsequent use.

To rephrase the example of the management of the schedules of the plurality of types described above, the server controller 11 may operate as follows to change, to the first vehicle 34, the second vehicle 35 of the type different from the type of the vehicle 30 allocated to the on-demand use from among the first vehicles 34. First, as the schedule of the second vehicle 35 to be changed to the first vehicle 34, the schedule for allocation to the reservation use is not set during the period determined based on the on-demand use period, and is set after an elapse of the period determined based on the on-demand use period. In this case, the server controller 11 changes the second vehicle 35 to the first vehicle 34 and sets the on-demand standby state during the period determined based on the on-demand use period, and allocates the second vehicle 35 to the reservation use after the elapse of the period determined based on the on-demand use period.

As described above, the server controller 11 temporarily changes the #6 vehicle 30 to the first vehicle 34 during the period of allocation of the #4 vehicle 30 to the on-demand use, thereby keeping the number of the first vehicles 34 to the first predetermined number or more.

When the schedule for allocation to the reservation use is not set for the #6 vehicle 30 after the time T5 as well, the server controller 11 may change the #6 vehicle 30 to manage the #6 vehicle 30 as the first vehicle 34 after the time T4, and then continue to manage the #6 vehicle 30 as the first vehicle 34 even after the time T6 or T5. Change of Vehicle 30 to Be Allocated to Reservation Use When a request for the reservation use is received from a user, the server controller 11 selects one second vehicle 35 as a vehicle 30 to be used by the user and reserves a schedule to use the second vehicle 35 based on the request. In other words, the server controller 11 sets, for the second vehicle 35, a schedule for allocation of the second vehicle 35 to the reservation use based on the request for the reservation use. As exemplified in FIG. 7, the server controller 11 sets the schedule for allocation to the reservation use for one second vehicle 35 parked in the standby slot 51 of the second area 50. The second vehicle 35 having the schedule for allocation to the reservation use is expressed as "reserved vehicle 38" enclosed by a dashed ellipse.

In the vehicle management system 1, the server controller 11 accepts the request for the reservation use until a time earlier than a use start time by the reservation limit period. The server controller 11 may select again the standby vehicle to be allocated to the reservation use at the time earlier than the time to start the reservation use by the reservation limit period. That is, the server controller 11 may cancel the schedule for allocation of the reserved vehicle 38 to the reservation use and allocate another vehicle 30 different from the reserved vehicle 38 to the reservation use at the time earlier than the time to start the reservation use by the reservation limit period.

Figure 7:
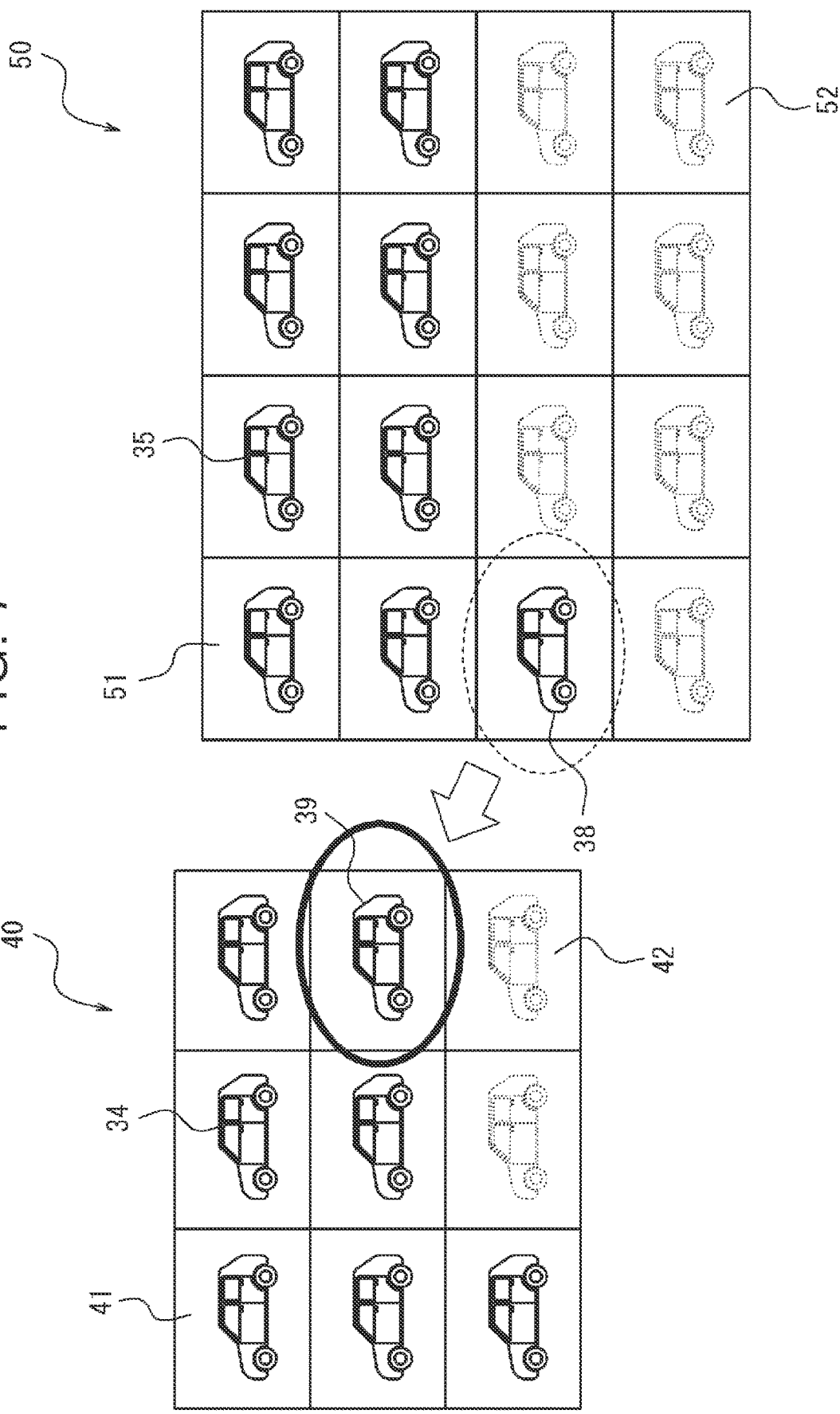
FIG. 7 is a diagram illustrating an example of reallocation of a reserved vehicle from a second vehicle to a first vehicle.

For example, when any first vehicle 34 is located closer to a use start location than the reserved vehicle 38 having the schedule for allocation to the reservation use, the server controller 11 may actually allocate the first vehicle 34 to the reservation use, and cancel the schedule set for the reserved vehicle 38. Specifically, the server controller 11 determines whether any first vehicle 34 is located closer to the use start location than the reserved vehicle 38 at the time earlier than the time to start the reservation use by the reservation limit period. In FIG. 7, it is assumed that a reallocative vehicle 39 enclosed by a continuous ellipse among the first vehicles 34 is located closer to the use start location than the reserved vehicle 38. In this case, the server controller 11 may cancel the schedule set for the reserved vehicle 38, and allocate the reallocative vehicle 39 to the reservation use. In other words, the server controller 11 may set the schedule of the reserved vehicle 38 again for the reallocative vehicle 39. Thus, movement distances of the vehicles 30 can be reduced. As a result, the efficiency of use of the vehicles 30 is improved.

Examples of Flowcharts

Figure 8:
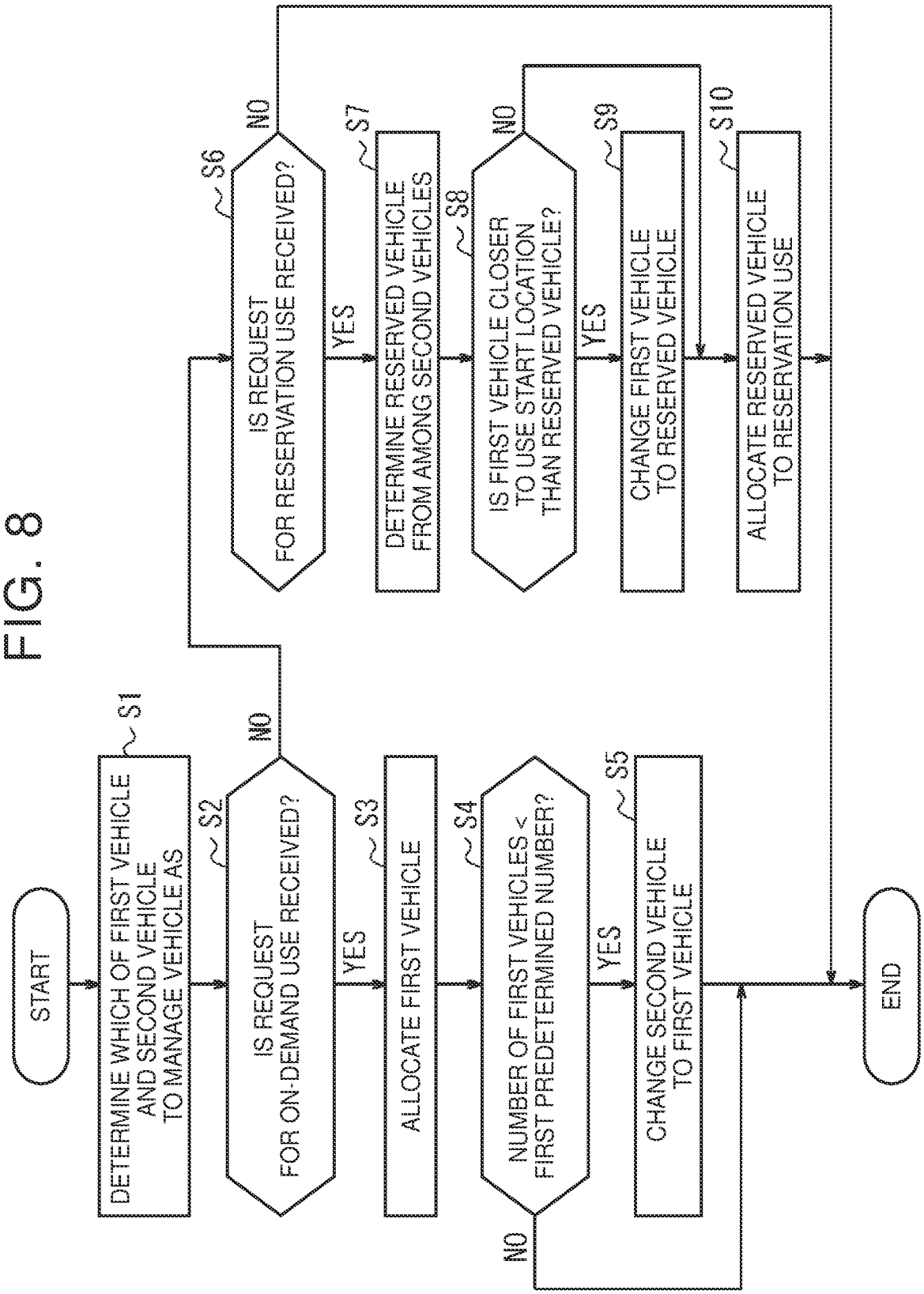
FIG. 8 is a flowchart illustrating an example of procedures of a vehicle management method according to the embodiment.

The server controller 11 may execute a vehicle management method including procedures in a flowchart exemplified in FIG. 8. The vehicle management method may be implemented as a vehicle management program to be executed by the processor of the server controller 11. The vehicle management program may be stored in a non-transitory computer-readable medium.

The server controller 11 determines which of the first vehicle 34 and the second vehicle 35 to manage each standby vehicle as (Step S1). That is, the server controller 11 determines whether to manage each standby vehicle as the first vehicle 34 or as the second vehicle 35. The server controller 11 may move a standby vehicle managed as the first vehicle 34 to the first area 40. The server controller 11 may move a standby vehicle managed as the second vehicle 35 to the second area 50.

The server controller 11 determines whether a request for the on-demand use is received from a user (Step S2). When the request for the on-demand use is not received from the user (Step S2: NO), the server controller 11 proceeds to a procedure of Step S6 described later.

When the request for the on-demand use is received from the user (Step S2: YES), the server controller 11 allocates the first vehicle 34 to the on-demand use (Step S3). Specifically, the server controller 11 selects a vehicle 30 to be allocated to the on-demand use from among the standby vehicles managed as the first vehicles 34, and allocates the selected vehicle 30 to the on-demand use. By allocating the first vehicle 34 to the on-demand use, the number of the first vehicles 34 decreases.

The server controller 11 determines whether the number of the first vehicles 34 is less than the first predetermined number (Step S4). When the number of the first vehicles 34 is not less than the first predetermined number (Step S4: NO), that is, the number of the first vehicles 34 is equal to or more than the first predetermined number, the server controller 11 terminates the execution of the procedures in the flowchart of FIG. 8.

When the number of the first vehicles 34 is less than the first predetermined number (Step S4: YES), the server controller 11 changes the second vehicle 35 to the first vehicle 34 to keep the number of the first vehicles 34 to the first predetermined number or more (Step S5). After the execution of the procedure of Step S5, the server controller 11 terminates the execution of the procedures in the flowchart of FIG. 8.

When the request for the on-demand use is not received from the user in the determination procedure of Step S2 (Step S2: NO), the server controller 11 determines whether a request for the reservation use is received from the user (Step S6). When the request for the reservation use is not received from the user (Step S6: NO), the server controller 11 terminates the execution of the procedures in the flowchart of FIG. 8.

When the request for the reservation use is received from the user (Step S6: YES), the server controller 11 determines a reserved vehicle 38 from among the second vehicles 35 (Step S7). Specifically, the server controller 11 sets a schedule for allocation to the reservation use for a vehicle 30 selected from among the second vehicles 35.

The server controller 11 determines whether the first vehicle 34 is closer to a use start location than the reserved vehicle 38 at a time earlier than a time to start the reservation use by the reservation limit period (Step S8). In other words, the server controller 11 determines whether there is any first vehicle 34 located closer to the use start location than the reserved vehicle 38. When the first vehicle 34 is not closer to the use start location than the reserved vehicle 38 (Step S8: NO), the server controller 11 proceeds to a procedure of Step S10.

When the first vehicle 34 is closer to the use start location than the reserved vehicle 38 (Step S8: YES), the server controller 11 changes the first vehicle 34 closer to the use start location to the reserved vehicle 38 (Step S9).

The server controller 11 allocates the reserved vehicle 38 to the reservation use at the time to start the reservation use (Step S10). After the execution of the procedure of Step S10, the server controller 11 terminates the execution of the procedures in the flowchart of FIG. 8.

Figure 9:
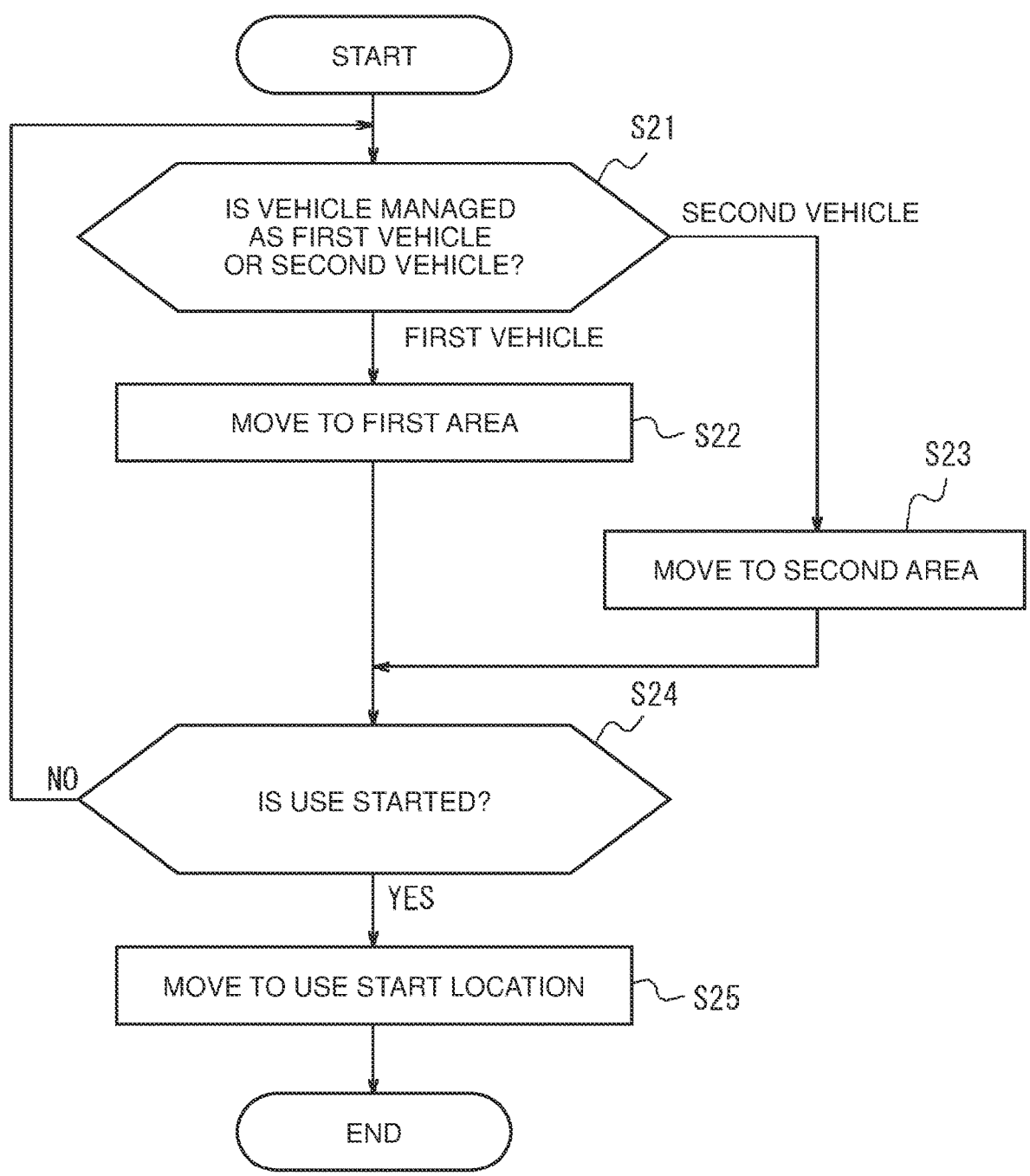
FIG. 9 is a flowchart illustrating an example of procedures of a vehicle control method according to the embodiment.

The vehicle controller 31 may execute a vehicle control method including procedures in a flowchart exemplified in FIG. 9. The vehicle control method may be implemented as a vehicle control program to be executed by the processor of the vehicle controller 31. The vehicle control program may be stored in a non-transitory computer-readable medium.

The vehicle controller 31 determines which of the first vehicle 34 and the second vehicle 35 the server controller 11 manages the vehicle 30 as (Step S21). Specifically, the vehicle controller 31 may acquire, from the server controller 11, information for determining which of the first vehicle 34 and the second vehicle 35 the vehicle 30 is managed as.

When the vehicle 30 is managed as the first vehicle 34 (Step S21: FIRST VEHICLE), the vehicle controller 31 moves the vehicle 30 to the first area 40 (Step S22). After the execution of the procedure of Step S22, the vehicle controller 31 proceeds to a procedure of Step S24. When the vehicle 30 is managed as the second vehicle 35 (Step S21: SECOND VEHICLE), the vehicle controller 31 moves the vehicle 30 to the second area 50 (Step S23). After the execution of the procedure of Step S23, the vehicle controller 31 proceeds to the procedure of Step S24.

The vehicle controller 31 determines whether a user starts to use the vehicle 30 (Step S24). When the use of the vehicle 30 is not started (Step S24: NO), the vehicle controller 31 returns to the procedure of Step S21. When the use of the vehicle 30 is started (Step S24: YES), the vehicle controller 31 moves the vehicle 30 to a use start location (Step S25). After the execution of the procedure of Step S25, the vehicle controller 31 terminates the execution of the procedures in the flowchart of FIG. 9.

SUMMARY

As described above, in the vehicle management system 1 according to this embodiment, the number of the first vehicles 34 to be allocated to the on-demand use is controlled to the first predetermined number or more. Thus, the user's request for the on-demand use is accepted easily. As a result, the user's convenience is improved. The number of the first vehicles 34 may be controlled to the second predetermined number or less. That is, the number of the first vehicles 34 may be controlled within the wide predetermined range. By controlling the number of the first vehicles 34 within the wide predetermined range, it is possible to reduce the frequency of changing the management method for the standby vehicles between the first vehicles 34 and the second vehicles 35. As a result, the efficiency of use of the vehicles 30 is improved. When the first vehicles 34 and the second vehicles 35 are parked in the first area 40 and the second area 50, respectively, the vehicles 30 are moved depending on the change of the management method. By reducing the frequency of changing the management method, the frequency of movement of the vehicles 30 can be reduced.

In the vehicle management system 1 according to this embodiment, the management method for the vehicles 30 can be changed based on a demand for the on-demand use or the reservation use. Thus, the user's convenience and the efficiency of use of the vehicles 30 can be improved. Specifically, the second vehicle 35 may be changed to the first vehicle 34 as a substitute for the first vehicle 34 allocated to the on-demand use. In this case, the change from the second vehicle 35 to the first vehicle 34 may be kept even after the return of the vehicle 30 allocated to the on-demand use. After the return of the vehicle 30 allocated to the on-demand use, the vehicle 30 need not be returned as the first vehicle 34. Thus, the frequency of movement of the vehicles 30 can be reduced. As a result, the efficiency of use of the vehicles 30 is improved.

When the schedule for allocation to the reservation use is set for the reserved vehicle 38, the schedule may be transferred to the first vehicle 34 located closer to the use start location than the reserved vehicle 38 at the time earlier than the time to start the reservation use by the reservation limit period. Thus, the movement distances of the vehicles 30 can be reduced. As a result, the efficiency of use of the vehicles 30 is improved.

Other Embodiments

When the vehicle 30 travels by autonomous driving, the vehicle controller 31 controls the traveling of the vehicle 30 based on management information output from the vehicle management device. Examples of the management information include information indicating whether the vehicle 30 is managed as the first vehicle 34 or as the second vehicle 35. The management information may include information indicating whether the vehicle 30 is allocated to the on-demand use or to the reservation use.

When the vehicle 30 is managed as the first vehicle 34, the vehicle controller 31 may move the vehicle 30 to the first area 40. When the vehicle 30 is managed as the second vehicle 35, the vehicle controller 31 may move the vehicle 30 to the second area 50. When the vehicle 30 is allocated to the on-demand use or to the reservation use, the vehicle controller 31 may move the vehicle 30 to the use start location.

The vehicle 30 may be a motor vehicle including a motor to be driven by electric power and a battery configured to supply electric power for driving the motor. In the vehicle 30 serving as the motor vehicle, the vehicle controller 31 may control charging of the battery based on management information output from the server 10. When the vehicle 30 is the motor vehicle, the preparatory operation for use of the vehicle 30 includes battery charging. That is, the preparatory period may include a period required to charge the battery.

Although the embodiments of the present disclosure have been described based on the drawings and examples, it should be noted that those skilled in the art may make various modifications and changes based on the present disclosure. It should therefore be noted that those modifications and changes fall within the scope of the present disclosure. For example, the functions included in the means, steps, or the like may be rearranged so as not to cause logical inconsistency, and a plurality of means, steps, or the like may be combined into a unit or divided apart from each other.

What is claimed is:
1. A vehicle management device comprising one or more processors configured to:
   manage a plurality of vehicles to be provided for users in a car sharing service;
   manage, as a first vehicles group, a part of the vehicles to be allocated to an on-demand use in which the users use the car sharing service without reservation;
   manage, as a second vehicles group, a part of the vehicles to be allocated to a reservation use in which the users use the car sharing service with the reservation;
   receive a user's request for use of a vehicle;
   determine whether the user's request is a request for the on-demand use or a request for the reservation use;
   (i) when the one or more processors determine that the user's request is the request for the reservation use, determine a second vehicle as a vehicle to be used by the user, among the second vehicles group,
   determine whether a first vehicle included in the first vehicles group is closer to a use start location than the second vehicle, when the one or more processors determine that the first vehicle is closer to the use start location than the second vehicle, change the determined vehicle to be used by the user from the second vehicle to the first vehicle, and determine the first vehicle as the vehicle to be used by the user, and transmit a notification to the vehicle to be used by the user, the notification including an information to move the vehicle to be used by the user to the user start location; and (ii) when the one or more processors determine that the user's request is the request for the on-demand use, determine a vehicle as the vehicle to be used by the user, among the first vehicles group, determine whether the number of vehicles of the first vehicles group is less than a first predetermined number, and change at least one of vehicles of the second vehicles group to be included in the first vehicles group when the one or more processors determine that the number of the vehicles of the first vehicles group is less than a first predetermined number.

2. The vehicle management device according to claim 1, wherein the one or more processors are configured to accept the request for the reservation use until a time earlier than a time to start the reservation use by a predetermined period.

3. The vehicle management device according to claim 1, wherein the one or more processors are configured to set, for the second vehicle, a schedule for allocation to the reservation use based on the request for the reservation use.

4. The vehicle management device according to claim 3, wherein the one or more processors are configured to change, to be included in the first vehicles group, the at least one of the vehicles of the second vehicles group for which the schedule for allocation to the reservation use is not set during a period determined based on a period of the on-demand use.

5. The vehicle management device according to claim 4, wherein the one or more processors are configured to calculate, as the period determined based on the period of the on-demand use, a period obtained by adding a preparatory period to make preparation for a subsequent use after return of a vehicle allocated to the on-demand use to the period of the on-demand use.

6. The vehicle management device according to claim 3, wherein the one or more processors are configured to:
change the at least one of the vehicles of the second vehicles group to be included in the first vehicles group during a period determined based on a period of the on-demand use, the at least one of the vehicles of the second vehicles group each being a vehicle of which a type differs from a type of the vehicle allocated to the on-demand use from among the first vehicles group and for which the schedule for allocation to the reservation use is not set during the period and is set after an elapse of the period; and
allocate the at least one of the vehicles of the second vehicles group to the reservation use after the elapse of the period.

7. The vehicle management device according to claim 3, wherein the one or more processors are configured to change the at least one of vehicles of the second vehicles group to be included in the first vehicles group, the at least one of the vehicles of the second vehicles group each being a vehicle of which a type differs from a type of the vehicle allocated to the on-demand use from among the first vehicles group and for which the schedule for allocation to the reservation use being not set.

8. The vehicle management device according to claim 3, wherein the one or more processors are configured to:
change the at least one of vehicles of the second vehicles group to be included in the first vehicles group, the at least one the of the vehicles of the second vehicles group each being a vehicle of which a type is identical to a type of the vehicle allocated to the on-demand use from among the first vehicles group and for which the schedule for allocation to the reservation use is not set during a period determined based on a period of the on-demand use and is set after an elapse of the period; and
allocate, to the reservation use, the vehicle allocated to the on-demand use after return of the vehicle allocated to the on-demand use.

9. The vehicle management device according to claim 1, wherein the one or more processors are configured to, when the number of the vehicles of the first vehicles group is more than a second predetermined number, change at least one of the vehicles of the first vehicles group to be included in the second vehicles group such that the number of the vehicles of the first vehicles group is the second predetermined number or less.

10. A vehicle management system comprising:
a vehicle management device including one or more processors; and
a plurality of vehicles to be provided for the users in the car sharing service, wherein:
the one or more processors is configured to,
manage the plurality of vehicles to be provided for users in a car sharing service,
manage, as a first vehicles group, a part of the vehicles to be allocated to an on-demand use in which the users use the car sharing service without reservation,
manage, as a second vehicles group, a part of the vehicles to be allocated to a reservation use in which the users use the car sharing service with the reservation,
receive a user's request for use of a vehicle,
determine whether the user's request is a request for the on-demand use or a request for the reservation use,
(i) when the one or more processors determine that the user's request is the request for the reservation use,
determine a second vehicle as a vehicle to be used by the user, among the second vehicles group,
determine whether a first vehicle included in the first vehicles group is closer to a use start location than the second vehicle,
when the one or more processors determine that the first vehicle is closer to the use start location than the second vehicle, change the determined vehicle to be used by the user from the second vehicle to the first vehicle, and determine the first vehicle as the vehicle to be used by the user, and
transmit a notification to the vehicle to be used by the user, the notification including an information to move the vehicle to be used by the user to the user start location, and
(ii) when the one or more processors determine that the user's request is the request for the on-demand use,
determine a vehicle as the vehicle to be used by the user, among the first vehicles group,
determine whether the number of vehicles of the first vehicles group is less than a first predetermined number, and change at least one of vehicles of the second vehicles group to be included in the first vehicles group when the one or more processors determine that the number of the vehicles of the first vehicles group is less than a first predetermined number; and the vehicle is configured to, receive the notification transmitted by the one or more processors, be moved to the user start location in response to receiving the notification.

11. The vehicle management device according to claim 1, the vehicles of the first vehicles group is different from the vehicles of the second vehicles group.

12. The vehicle management device according to claim 1, the one or more processors is configured to:

when a return vehicle is returned by the user, determine whether the number of the vehicles of the first vehicles group is less than a second predetermined number, the return vehicle being determined as the vehicle to be used by the user among the second vehicles group, the second predetermined number is larger than the first predetermined number;

when the one or more processors determines that the number of the vehicles of the first vehicles group is less than a second predetermined number, change the return vehicle to be included in the first vehicles group.

13. A vehicle management method comprising:

managing a plurality of vehicles to be provided for users in a car sharing service;

managing, as a first vehicles group, a part of the vehicles to be allocated to an on-demand use in which the users use the car sharing service without reservation;

managing, as a second vehicles group, a part of the vehicles to be allocated to a reservation use in which the users use the car sharing service with the reservation;

receiving a user's request for use of a vehicle;

determining whether the user's request is a request for the on-demand use or a request for the reservation use;

(i) when it is determined that the user's request is the request for the reservation use, determining a second vehicle as a vehicle to be used by the user, among the second vehicles group, determining whether a first vehicle included in the first vehicles group is closer to a use start location than the second vehicle, when it is determined that the first vehicle is closer to the use start location than the second vehicle, changing the determined vehicle to be used by the user from the second vehicle to the first vehicle, and determining the first vehicle as the vehicle to be used by the user, and transmitting a notification to the vehicle to be used by the user, the notification including an information to move the vehicle to be used by the user to the user start location; and (ii) when it is determined that the user's request is the request for the on-demand use, determining a vehicle as the vehicle to be used by the user, among the first vehicles group, determining whether the number of vehicles of the first vehicles group is less than a first predetermined number, and changing at least one of vehicles of the second vehicles group to be included in the first vehicles group when it is determined that the number of the vehicles of the first vehicles group is less than a first predetermined number.

* * * * *